UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

AZO DYE FOR LAKES.

SPECIFICATION forming part of Letters Patent No. 650,757, dated May 29, 1900.

Application filed January 10, 1900. Serial No. 991. (Specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria, Germany, have invented new and useful Improvements in the Manufacture of a New Monoazo Coloring-Matter, of which the following is a specification.

My invention consists in the production of a new mono-azo coloring-matter which derives its especial value from the fact that it in the form of its salts with several of the metals is insoluble or practically insoluble in water, so that they can be used as colored printing-lakes in lithography, in the manufacture of colored papers and of paints with oils, and for similar purposes.

My new azo-dye is obtained by diazotizing 2-naphthylamin-1 sulfoacid and combining the diazo compound thus obtained with beta-naphthol. Already in the form of its free acid my new coloring-matter is characterized to a striking degree by its sparing solubility in water in that it is almost insoluble in cold water and somewhat soluble in boiling water. The alkali salts are less soluble in hot water than the free acid, and in the form of such salts as those with calcium, barium, aluminum, and lead the new coloring-matter is practically insoluble even in boiling water. These salts possess a red color and are fast against the action of acids and light and do not sublime, as is the case with many insoluble azo dyes.

The chemical characteristics by which my coloring-matter can best be recognized are as follows: On reduction the 2-naphthylamin-1-sulfoacid is obtained, and this on prolonged boiling in acid solution yields beta-naphthylamin.

On treating my new coloring-matter with concentrated sulfuric acid it yields a brilliant red-violet color.

The following example will serve to further illustrate the manner in which my invention can best be carried into practical effect and my new coloring-matter obtained.

Example: Dissolve about two hundred and twenty-three (223) parts of 2-naphthylamin-1-sulfoacid in about one thousand (1,000) parts of water containing about one hundred and twenty (120) parts of caustic-soda lye containing thirty five per cent. NaOH. To this add a solution of sixty-nine (69) parts of sodium nitrite. Run the mixed solutions into a mixture of three hundred and fifty (350) parts of hydrochloric acid (containing about thirty per cent. HCl) with an equal volume of water. Stir while mixing and continue stirring until the production of the diazo compound is completed. The diazo compound separates out almost completely as a sulfur-yellow crystalline precipitate. Collect by filtering, mix the crystalline mass with a little water to form a paste, and pour this paste into a solution of about one hundred and fifty (150) parts of beta-naphthol in four hundred parts (400) parts of water containing about one hundred and twenty (120) parts of caustic-soda lye containing about thirty-five per cent. NaOH. The union takes place almost instantaneously. Boil the mixture, filter hot, press, and dry. In this way my new coloring-matter is obtained in the form of its sodium salt. In order to obtain it as the free acid, after pressing the sodium salt, but before drying, stir the press-cake with water to a paste and add hydrochloric acid. Filter and wash the color till sufficiently free from hydrochloric acid.

My new coloring-matter can be obtained in the form of its salts with the other metals mentioned by double decomposition of the sodium salt with the soluble salts of the other metals or by boiling the free acid with the salts of these metals, if necessary, in the presence of their carbonates or of other agents for binding the free acid formed. If desired, these combinations can be effected in the presence of a substratum or base, such as is used for lakes, or under such conditions that the substratum or base forms simultaneously with the lakes. As instances of such substrata or bases I mention barium sulfate, lead sulfate, and aluminum hydroxid.

Now what I claim is—

The mono-azo coloring-matter which can be obtained by diazotizing 2-naphthylamin-1-sulfoacid and combining the diazo compound with beta-naphthol and which in the form of its calcium, barium, lead, and alumina salts is practically insoluble in boiling water and which on reduction with stannous chlorid yields a naphthylamin sulfoacid which on boiling in acid solution is converted into beta-naphthylamin and which gives a red-violet color with concentrated sulfuric acid, all substantially as described.

In testimony whereof I have hereunto set my hand in the presence of two subscribing witnesses.

PAUL JULIUS.

Witnesses:
ERNEST F. EHRHARDT,
OSCAR BALLY.